(12) United States Patent
Kim

(10) Patent No.: US 6,286,889 B1
(45) Date of Patent: Sep. 11, 2001

(54) TRIM MEMBERS FOR TAILGATE OF AUTOMOBILE

(75) Inventor: Yong-Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/675,041

(22) Filed: Sep. 28, 2000

(51) Int. Cl.[7] .................................................. B60J 5/00
(52) U.S. Cl. ..................................... 296/146.7; 296/146.8; 296/56
(58) Field of Search .............................. 296/146.7, 146.8, 296/146.9, 39.1, 56; 49/502

(56) References Cited

U.S. PATENT DOCUMENTS

| | | | |
|---|---|---|---|
| 4,433,866 | * | 2/1984 | Hagiwara ........................ 296/146.7 X |
| 5,591,078 | * | 1/1997 | Fillion et al. .................... 296/146.7 X |
| 5,906,409 | * | 5/1999 | DeRees et al. ................... 296/146.7 |

* cited by examiner

Primary Examiner—Joseph D. Pape
(74) Attorney, Agent, or Firm—Christie, Parker & Hale, LLP

(57) ABSTRACT

Trim members for tailgate of automobile adapted to enable an overlapped portion among various trim members assembled to an inner panel of a tailgate to be integrally secured to an inner panel to thereby prevent the overlapped portion from being drooped or curled up, the trim members comprising: an upper trim member mounted at a door of the automobile and having a tip end; a lateral trim member mounted at the door and having a tip end overlappingly arranged with the tip end; and coupling unit for coupling the overlapped tip ends to the door, wherein the coupling unit comprises: a flange unit having a through hole formed at any one tip end thereof; a protruder formed at the other tip end so as to be inserted into the through hole; and a spring clip for coupling the protruder to the door.

4 Claims, 5 Drawing Sheets

TRIM MEMBERS FOR TAILGATE OF AUTOMOBILE

BACKGROUND OF THE INVENTION

1. Field of the Invention

The present invention relates to a door of automobile, and more particularly to trim members for tailgate of automobile adapted to prevent an overlapped portion in a plurality of trim members mounted at a rear side of a tailgate from getting loose, thereby improving a mountability of the trim members.

2. Description of the Prior Art

Generally, a tailgate 10 mounted at a rear end of an automobile body to be opened and closed for accommodation of various articles is hinged at an upper end thereof to a rear tip portion of a roof panel 2 of the automobile body 1 as illustrated in FIG. 1, where the tailgate 10 is so structured as to be opened and closed when pivoted relative to the roof panel 2.

The tailgate 10 is also mounted at a rear periphery thereof with a plurality of trim members 12 as shown in FIG. 2. The trim member 12 includes an upper trim member 12*a* assembled to an upper rear portion of the tailgate 10, a lateral trim member 12*b* assembled to both rear lateral sides of the tailgate 10 and a lower trim member 12*c* assembled to rear lower portion of the tailgate 10.

Meanwhile, the trim member comprising the upper trim member 12, lateral trim member 12*b* and lower trim member 12*c* is secured to a rear surface of the tailgate 10 via a plurality of spring clips 14 as illustrated in FIG. 3 where a coupling structure between the upper trim member 12*a* and the spring clips 14 is depicted in FIG. 4 for illustrating a section taken along line A—A of FIG. 3.

In other words, a protruder 17 is secured to a rear surface of inner panel 11 of the tailgate 10 via the spring clips 14, where the protruder 17 is integrally formed on reinforcing ribs 16 integrally formed to provide a reinforced structural strength to a rear surface of the upper trim member 12*a*.

The structure where the protruder 17 of the reinforcing ribs 16 integrally formed at the rear surface of the trim member 12 is secured at the rear surface of the inner panel 11 of the tailgate 10 via the spring clips applies to other members including the upper trim member 12, lateral trim member 12*b* and the lower trim member 12*c* in the same coupling fashion.

The protroduer 17 formed on each rear surface of the upper trim of member 12*a* and the lateral trim member 12*b* is firmly secured to the inner panel of the tailgate 10 while adjacent portions are overlapped by the upper trim member 12*a* and the lateral trim member 12*b* with a predetermined length as show in FIG. 5 for illustrating a section taken along line B-B of FIG. 3.

However, there is a problem in the mounting structure of trim members for tailgate of automobile according to the prior art thus described in that an upper tip end portion of the lateral trim member 12*b* can hardly receive a supporting force in a structure where adjacent portions are overlapped by the upper trim member 12*a* and the lateral trim member 12*b* (in other words, in a case there both tip end portions of the upper trim member 12*a* are overlapped inwardly into a tip end portion of the lateral trim member 12*b*), such that the upper tip end portion of the lateral trim member 12*b* is drooped by its own weight to thereby be deformed (see dotted lines in FIG. 5).

There is another problem in that, when the trim member 12 mounted into the tailgate 10 is drooped to be deformed, external appearance is deteriorated and noise called rattle noise is generated while an automobile is running.

SUMMARY OF THE INVENTION

The present invention is disclosed to solve the aforementioned problems and it is an object of the present invention to provide trim members for tailgate of automobile adapted to enable an overlapped portion among various trim members assembled to an inner panel of a tailgate to be integrally secured to an inner panel to thereby prevent the overlapped portion from being drooped or curled up.

In accordance with the object of the present invention, there is provided trim members for tailgate of automobile, the trim members comprising:

an upper trim member mounted at a door of the automobile and having a tip end;

a lateral trim member mounted at the door and having a tip end overlappingly arranged with the tip end; and coupling means for coupling the overlapped tip ends to the door.

The coupling means comprises:

a flange unit having a through hole formed at any one tip end thereof;

a protruder formed at the other tip end so as to be inserted into the through hole; and a spring clip for coupling the protruder to the door.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, preferred embodiment of the present invention will be described in detail with reference to the accompanying drawings.

Figure 1:
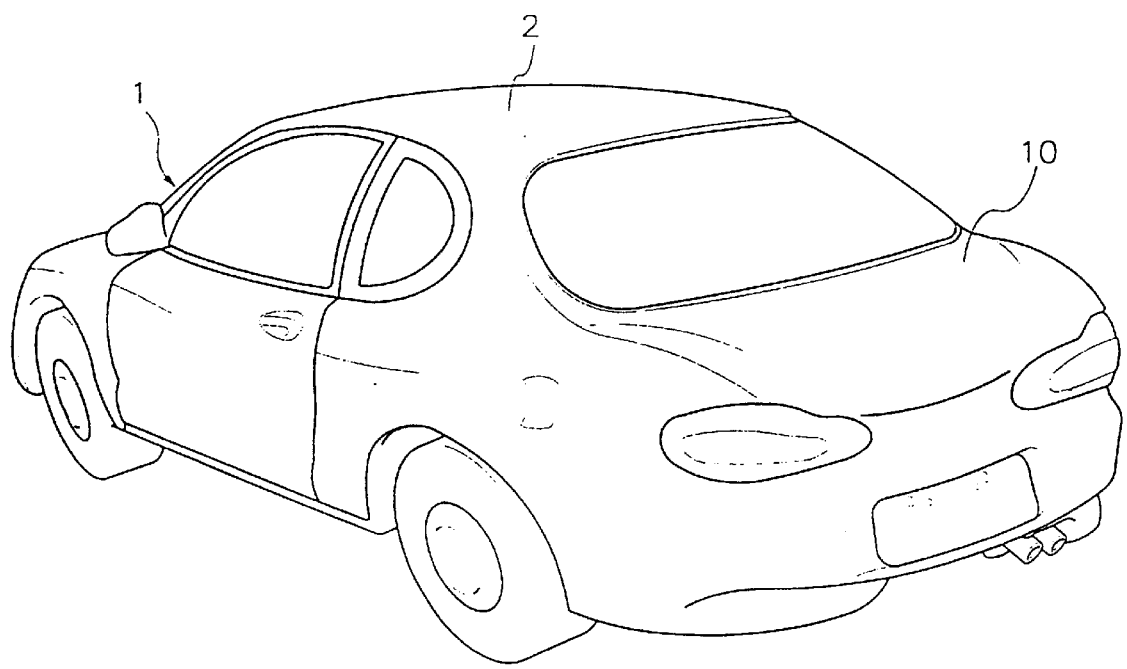
FIG. 1 is a perspective view for schematically illustrating a rear body of an automobile mounted with a tailgate.
Figure 2:
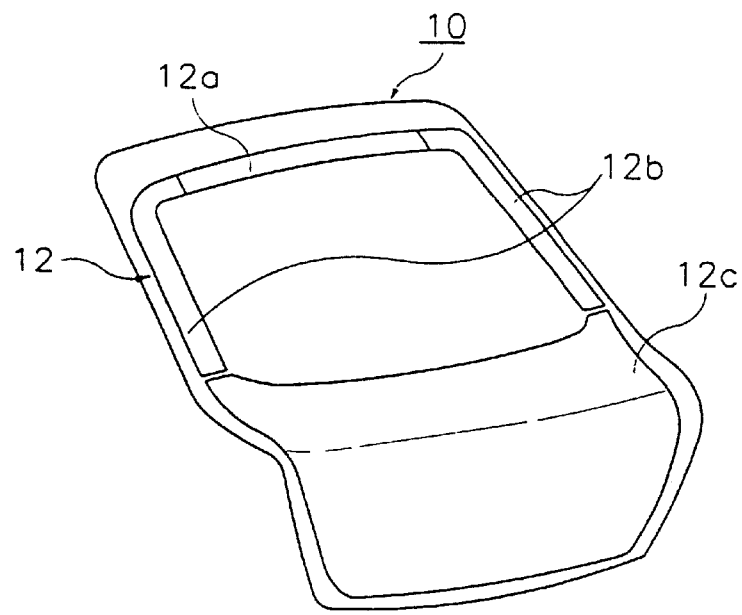
FIG. 2 is a schematic diagram for illustrating various trim members mounted at rear surface of the tailgate according to the prior art.
Figure 3:
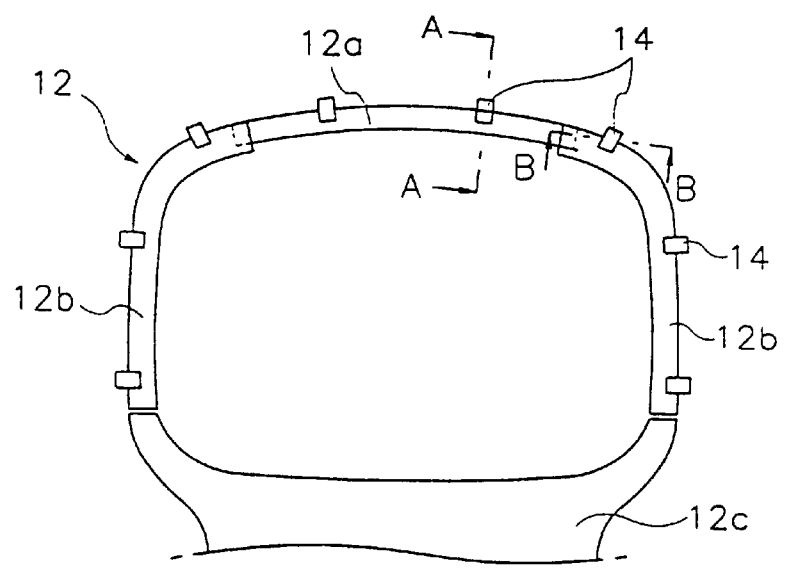
FIG. 3 is a front diagram viewed from rear surface of tailgate for illustrating a mounted state of various trim members depicted in FIG. 2.
Figure 4:
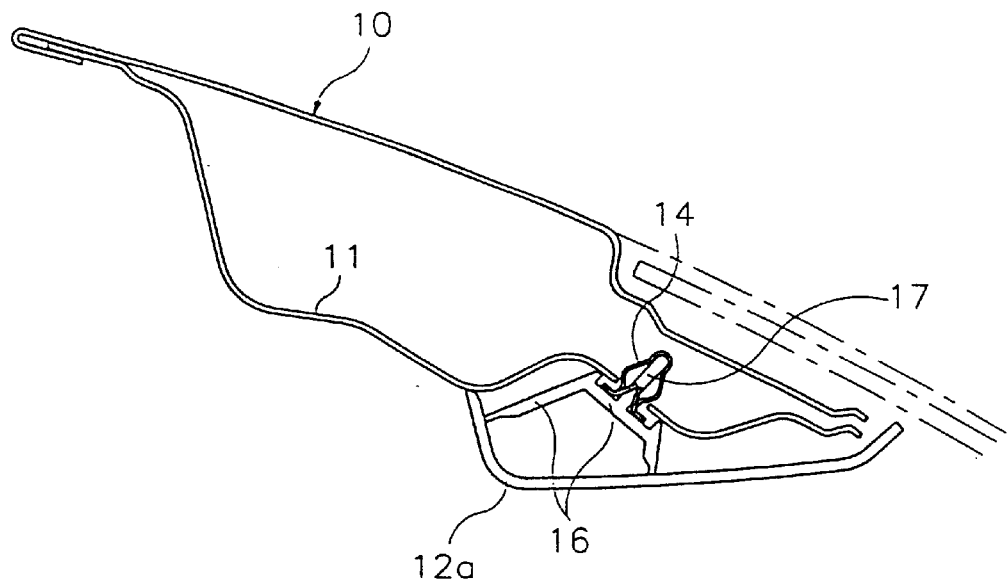
FIG. 4 is a sectional view taken along line A—A of FIG. 3.
Figure 5:
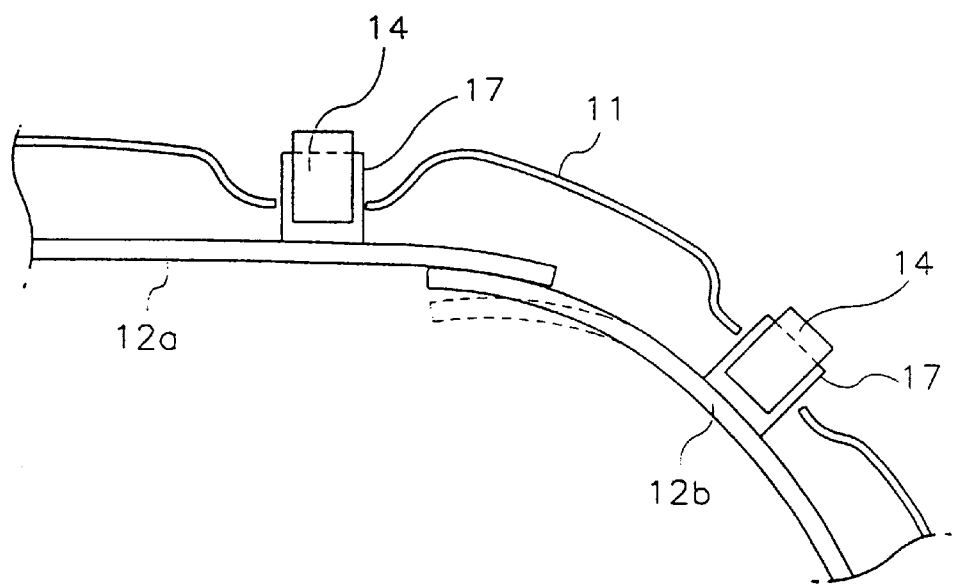
FIG. 5 is a sectional view taken along line B—B of FIG. 3.
Figure 6:
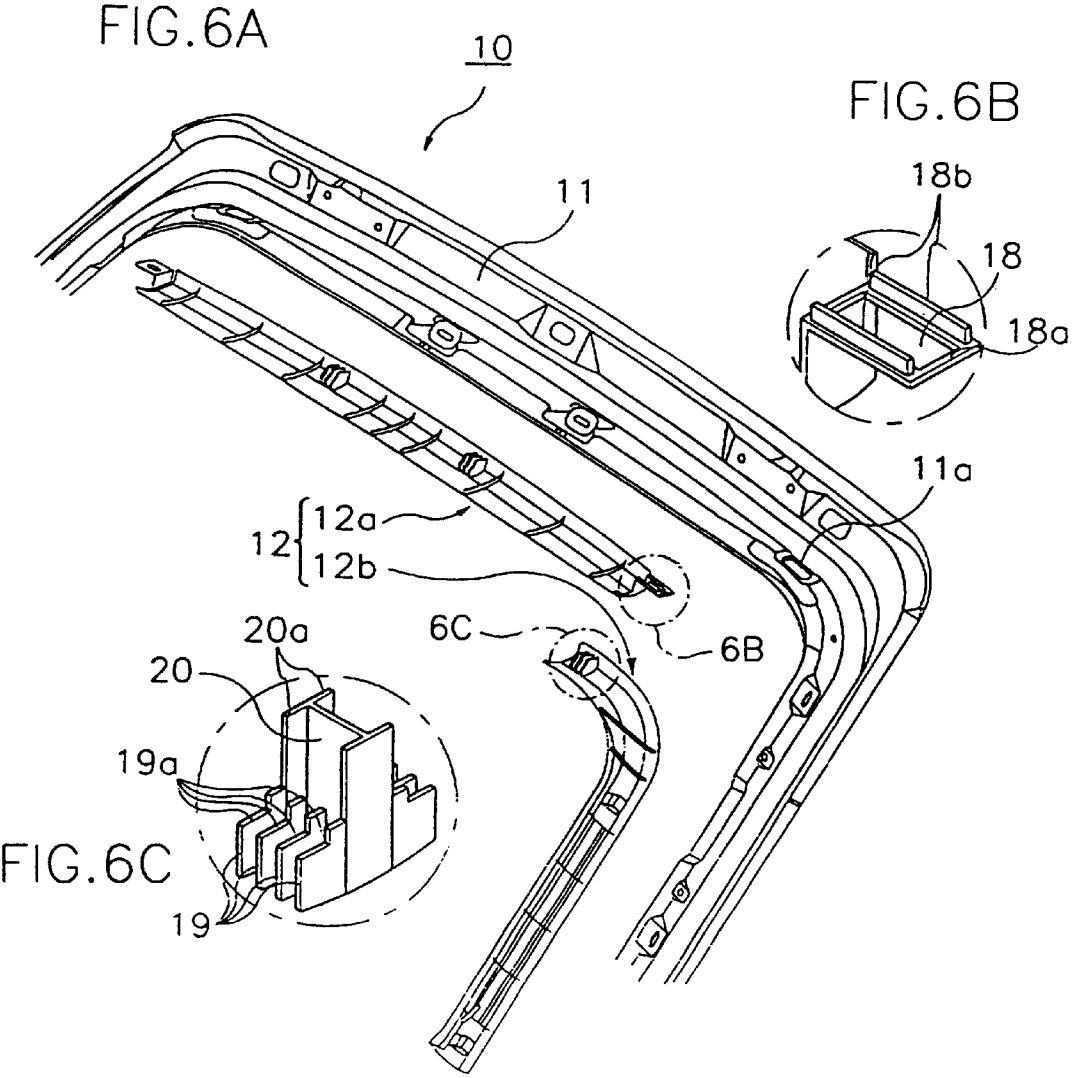
FIG. 6, consisting of FIGS. 6A through 6C, is an exploded perspective view for illustrating a mounting state of trim members at tailgate according to the present invention.
Figure 7:
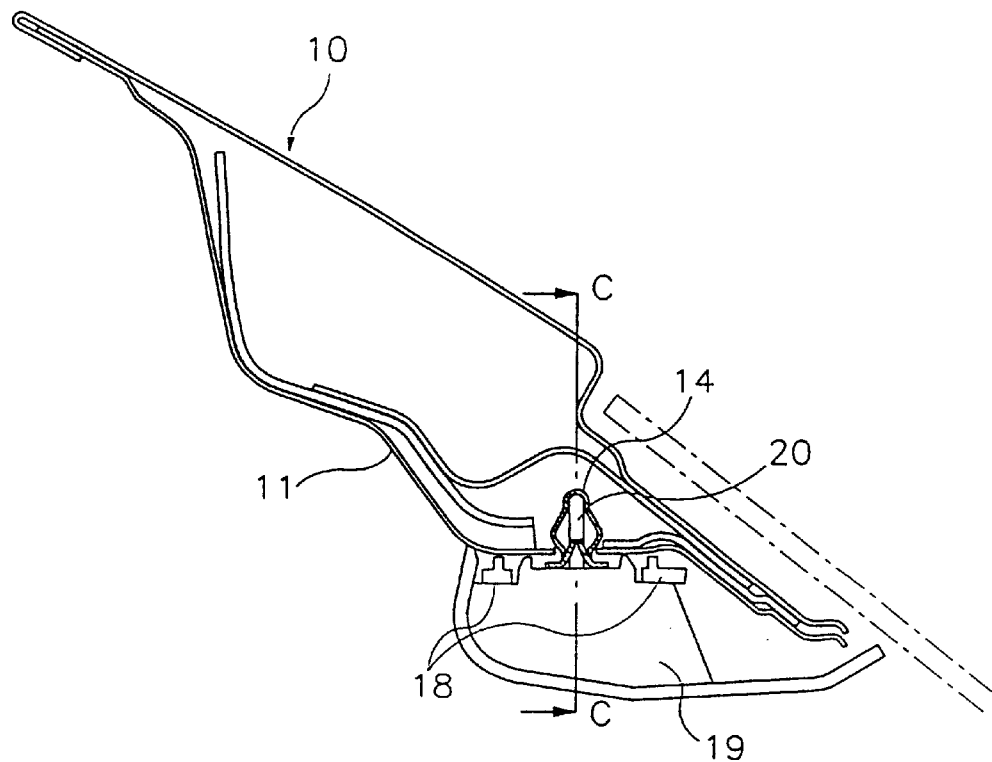
FIG. 7 is a longitudinal sectional view for illustrating a mounted portion of trim member shown in FIG. 6.
Figure 8:
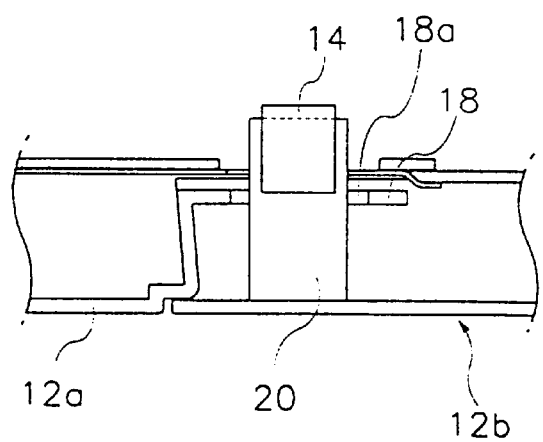
FIG. 8 is a sectional view taken along line C—C of FIG. 6.

FIG. 6 is an exploded perspective view for illustrating trim members mounted at the tailgate, FIG. 7 is a longitudinal sectional view for illustrating a mounted portion of trim member illustrated in FIG. 6 and FIG. 8 is a sectional view taken along line C—C of FIG. 7, where like reference numerals are designated for equivalent or like parts or portions as in FIGS. 2, 3, 4 and 5, and reference numerals for principal parts of tailgate not designated will refer to FIG. 1.

The present invention has a construction where an upper trim member 12a and a lateral trim member 12b forming a trim member 12 mounted at an inner panel 11 of a tailgate 10 are a little bit overlapped at mutual adjacent portions thereof and simultaneously secured to the inner panel 11, as illustrated in drawings.

In order to make the tailgate structured as above, the upper trim member 12a is integrally formed at both tip end portions thereof with a flange unit 18 formed to protrude inwardly and centrally having a through hole 18a thereof and a reinforcing rib 18b protruded on an external side of the through hole 18a, while the lateral trim member 12b is integrally defined at an upper tip portion thereof with a plurality of reinforcing ribs 19 for insertion into the through hole 18a at the flange unit 18 and a protruder 20 lengthily protruded from the reinforcing ribs 19.

The reinforcing ribs 19 arranged at an upper tip end of the lateral trim member 12b are integrally formed with staired accommodation units 19a, each accommodation unit 19a being formed to fit to an inner surface of the through hole 18a at the flange unit 18 formed at tip end of the upper trim member 12a.

Furthermore, the protruder 20 is integrally provided with a hitching jaw 20a protruding to both tip ends, where the hitching jaw 20a forcibly prevents the spring clip 14 from being detached from the protruder 20 toward the lateral side when the protruder 20 is coupled to the spring clip 14.

Meanwhile, the portion where the upper trim member 12a and the lateral trim member 12b are not overlapped is mounted with a reinforcing rib of the same conventional type and a protruder therefrom, such that the protruder is secured to a rear surface of the inner panel 11 of the tailgate 10 via each spring clip (not shown).

So, in order to secure the trim member 12 to the inner panel 12 of the tailgate 10, the reinforcing rib 19 at the lateral trim member 12b is inserted into the through hole 18a defined at the flange unit 18 of the upper trim member 12a and the protruder 20 lengthily extended from the reinforcing rib 19 is inserted into the through hole of the inner panel 11 for coupling at a rear surface thereof by way of the spring clip 14.

When the tip end portion of the upper trim member 12a and the tip end portion of the lateral trim member 12b are coupled and mounted via the spring clips 14 at the inner panel 11 of the tailgate 10 in an overlapped state, each at a predetermined length, no deformation such as curl-up or getting loose is generated at the overlapped portion between the upper trim member 12a and the lateral trim member 12b.

As a result, various trim members 12 inside the tailgate 10 are firmly fixed to the inner panel 11 to improve an external appearance and to prevent the rattle noise according to curl-up or getting loose between the upper trim member 12a and the lateral trim member 12b from being generated as the time lapses.

As apparent from the foregoing, there is an advantage in the trim members for tailgate of automobile thus described according to the present invention in that an adjacent portion between the upper trim member and the lateral trim member, each member being overlapped at a predetermined portion thereof, is integrally secured to a rear surface of the inner panel by way of spring clips to avoid occurrence of deformation such as curl-up or getting loose of trim members and to prevent abnormal noise from being generated.

What is claimed is:

1. Trim members for tailgate of automobile, the trim members comprising:

an upper trim member mounted at a door of the automobile and having a tip end;

a lateral trim member mounted at the door and having a tip end overlappingly arranged with the tip end; and coupling means for coupling the overlapped tip ends to the door.

2. The trim members as defined in claim 1, wherein the coupling means comprises:

a flange unit having a through hole formed at any one tip end thereof;

a protruder formed at the other tip end so as to be inserted into the through hole; and a spring clip for coupling the protruder to the door.

3. The structure as defined in claim 2, wherein the protruder further comprises a reinforcing rib having an accommodation unit contacting an inner surface of the through hole.

4. The apparatus as defined in claim 2, wherein the protruder is formed at both tip ends thereof with hitching jaws for preventing the spring clips from being detached.

* * * * *